United States Patent
Nagao

(10) Patent No.: US 7,440,409 B2
(45) Date of Patent: Oct. 21, 2008

(54) NETWORK TRAFFIC MONITORING SYSTEM AND MONITORING METHOD

(75) Inventor: Yasutaka Nagao, Tokyo (JP)

(73) Assignee: NEC Corporation, Tokyo (JP)

( * ) Notice: Subject to any disclaimer, the term of this patent is extended or adjusted under 35 U.S.C. 154(b) by 750 days.

(21) Appl. No.: 10/844,448

(22) Filed: May 13, 2004

(65) Prior Publication Data

US 2004/0213267 A1    Oct. 28, 2004

Related U.S. Application Data

(62) Division of application No. 09/761,696, filed on Jan. 18, 2001, now abandoned.

(30) Foreign Application Priority Data

Jan. 19, 2000    (JP) .............................. 2000-009605

(51) Int. Cl.
*H04J 1/16*    (2006.01)
*H04L 12/56*    (2006.01)

(52) U.S. Cl. ..................................... 370/252; 370/392

(58) Field of Classification Search ................. 370/469, 370/235, 230, 252, 474, 352–356, 400, 401, 370/237, 238, 392, 254–258, 389; 709/223–226, 709/238–242
See application file for complete search history.

(56) References Cited

U.S. PATENT DOCUMENTS

| | | | |
|---|---|---|---|
| 6,421,319 B1 * | 7/2002 | Iwasaki | 370/230 |
| 6,459,682 B1 * | 10/2002 | Ellesson et al. | 370/235 |
| 6,775,280 B1 * | 8/2004 | Ma et al. | 370/392 |
| 2004/0022191 A1 * | 2/2004 | Bernet et al. | 370/230 |

FOREIGN PATENT DOCUMENTS

| | | |
|---|---|---|
| JP | 05-219123 | 8/1993 |
| JP | 07-321783 | 12/1995 |
| JP | 11-163929 | 6/1999 |
| JP | 11-293620 | 10/1999 |

\* cited by examiner

*Primary Examiner*—John Pezzlo
(74) *Attorney, Agent, or Firm*—Young & Thompson

(57) ABSTRACT

In a network traffic monitoring system and method for capturing a service distribution to monitor an IP network using Diffserv protocol, each IP packet on the network is monitored by extracting DSCP and IP addresses from a header of the packet. Then, traffic information is accumulated for each service class and for each sub network address, using the extracted information.

9 Claims, 5 Drawing Sheets

NETWORK TRAFFIC MONITORING SYSTEM AND MONITORING METHOD

CROSS REFERENCE TO RELATED APPLICATIONS

This application is a division of co-pending application Ser. No. 09/761,696, filed on Jan. 18, 2001, the entire contents of which are hereby incorporated by reference.

BACKGROUND OF THE INVENTION

1. Field of the Invention

The invention relates to a network traffic monitoring system and a network traffic monitoring method which is used in the system and, in particular, to the traffic monitoring method which is used in a large scale IP (Internet Protocol) network.

2. Description of the Related Art

In a conventional traffic monitoring method, it is usual that a source IP address and a destination IP address are read from an IP header, and counting operation of packets is performed based on a species of an upper or a host application which is identified from a pair of the source and the destination IP addresses together with a port number defined on the fourth layer of the hierarchical model known in the art. Briefly, traffic is monitored on the basis of counts of the counting operation in the conventional traffic monitoring method.

On the other hand, a new protocol has been proposed by IETF (Internet Engineering Task Force). The new protocol introduces the concept of a priority level so as to grade transferring services of IP packets from one to another, although, in a traditional way, each IP packet is equally transferred without any distinction. The new protocol is referred to as "Diffserv (Differentiated Service)" protocol.

In a terminal adapted to the Diffserv protocol or in a router which is located at a boundary to the Diffserv protocol, IP packets are classified into a plurality of service levels or classes (fourteen classes prescribed in IETF RFC 2475) based on a source IP address, a destination IP address, a port number used by IP packet, and other elements. In addition, packet transmission is carried out with DSCP (Diffserv Code Point) embedded as information in an IP header.

A router which supports the Diffserv protocol is specified by architecture such that each priority level is determined from a value of DSCP embedded in the IP header, and a transferring method is determined based on each priority level. Thereby, the IP packets are treated as a plurality of kinds of flows which are classified into classes As a result, it is possible to lower a discard rate of IP packets in a specified host or to transfer IP packets from a specified application in a short delay time.

However, when the conventional traffic monitoring method is operated in accordance with the Diffserv protocol, the method can not capture the transferring priority provided by Diffserv protocol and can not monitor what service is assigned to a network. This is because the conventional traffic monitoring method classifies whole packets only on the basis of a port number of the fourth layer for each application.

Further, since the conventional traffic monitoring method also classifies packets transferred by using end-to-end protocol, the number of IP addresses to be treated is inevitably increased. In consequence, a memory capacity of traffic monitor unit is increased and a burden on a network manager is increased, as the scale of a network becomes large. Therefore, the conventional traffic monitoring method can not cope with enlargement of the network.

Furthermore, in a protocol, such as IPsec (Security Architecture for Internet Protocol) or IPoverIP, each packet can not be classified for each application, since it is not able to monitor a port number of the fourth layer protocol in a network using the above-exemplified protocols.

SUMMARY OF THE INVENTION

It is, therefore, an object of the invention to provide a network traffic monitoring system and a monitoring method used in the system, each of which can overcome the above problems.

Furthermore, it is an object of the invention to provide a network traffic monitoring system and a monitoring method used in the system, which are capable of grasping a distribution of services which is important to know about performance of the network in an IP network using Diffserv protocol. As a result, the system and the method can adapt to a large scale network.

According to a first aspect of the invention, there is provided a traffic monitoring system which monitors network traffic in a network in which transmission priority of a packet to be transmitted in the network is changed according to an attribute of the packet. The system comprises a monitor unit which monitors the packet, and an accumulate unit which accumulates, for each attribute, traffic information corresponding to the monitored packet.

According to a second aspect of the invention, there is provided a traffic monitoring system of the first aspect of the invention, wherein the packet is an IP packet in an IP network, and the attribute of the packet includes at least one of a service class of the IP packet and sub network address of the IP network.

According to a third aspect of the invention, there is provided a traffic monitoring system which monitors network traffic in an IP network in which an IP packet is transmitted according to a service class which is classified based on Diffserv protocol. The system comprises a monitor unit which monitors the IP packet on the IP network, a detection unit which detects at least one of the service class, a source IP address, and a destination IP address of the IP packet, and a classify unit which classifies traffic information based on the detected information.

According to a fourth aspect of the invention, there is provided a traffic monitoring method which monitors network traffic in a network in which transmission priority of a packet to be transmitted in the network is changed according to an attribute of the packet. The method comprises the steps of monitoring the packet, and accumulating, for each attribute, traffic information corresponding to the monitored packet.

According to a fifth aspect of the invention, there is provided a traffic monitoring method which monitors network traffic in an IP network in which an IP packet is transmitted according to a service class which is classified based on Diffserv protocol. The method comprises the steps of monitoring the IP packet on the IP network, detecting at least one of the service class, a source IP address, and a destination IP address of the IP packet, and classifying traffic information based on the detected information.

According to a sixth aspect of the invention, there is provided a recording medium readable by a computer, tangibly embodying a program of instructions executable by the computer to perform a traffic monitoring method which monitors network traffic in a network in which transmission priority of a packet to be transmitted in the network is changed according to an attribute of the packet. The method comprises the steps of monitoring the packet, and accumulating, for each attribute, traffic information corresponding to the monitored packet.

According to a seventh aspect of the invention, there is provided a recording medium readable by a computer, tangibly embodying a program of instructions executable by the computer to perform a traffic monitoring method which monitors network traffic in an IP network in which an IP packet is transmitted according to a service class which is classified based on Diffserv protocol. The method comprises the steps of monitoring the IP packet on the IP network, detecting at least one of the service class, a source IP address, and a destination IP address of the IP packet, and classifying traffic information based on the detected information.

Therefore, according to the network traffic monitoring system, it is capable of reducing data to be gathered, since the data are put together by monitoring network traffic (packets) for each service and for each sub network. Consequently, the system can be applied to a large scale network.

Specifically, according to the network traffic monitoring system, NEs (network element) each of which serves an IP router which is a part of an IP network are connected to each other, and between then, IP packets are transferred which are classified based on Diffserv (Differentiated Service) protocol.

DESCRIPTION OF THE PREFERRED EMBODIMENT

Figure 1:
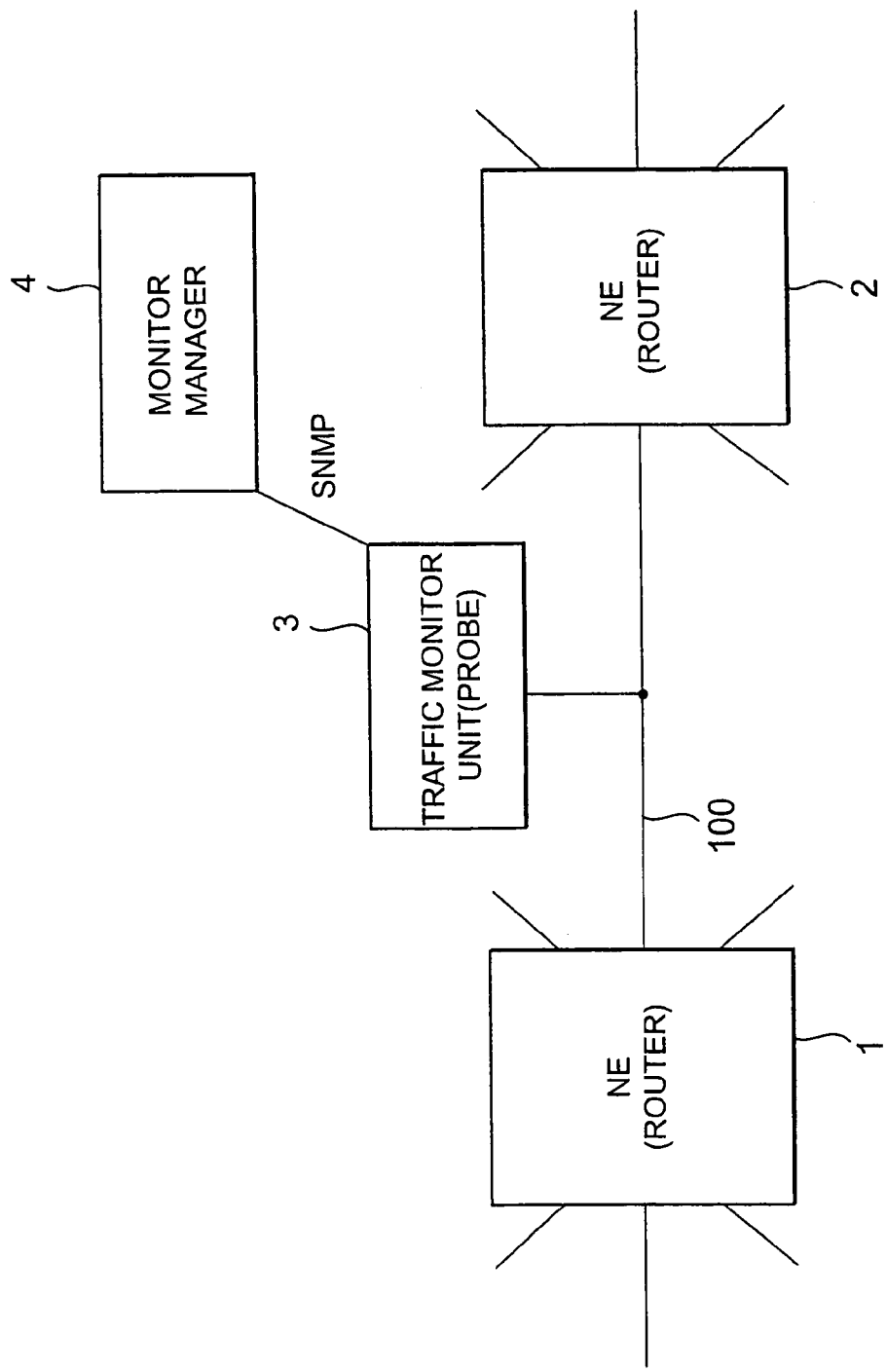
FIG. 1 shows a block diagram of a network traffic monitoring system of an embodiment of the invention.

At first, illustration is made about an embodiment of the invention with reference to FIG. 1.

In FIG. 1, each of NEs (Network Element) 1 and 2 is an IP router which is a part of an IP network. The NEs 1 and 2 are connected to each other via a link 100 and IP packets are transferred between them. The IP packets are classified based on Diffserv protocol that is proposed by the IETF and that defines each priority level of the IP packets.

Diffserv protocol classifies IP packets on the basis of quality of transmission. In the protocol, DSCP (Diffserv Code Point) representing a service class is assigned to a field in IP header. In the field, fourteen sorts of DSCP values are practically set and according to this value, the priority level of transmission of the IP packet is determined.

A traffic monitor unit (probe) 3 monitors IP packets passing through the link 100. Specifically, the illustrated traffic monitor unit 3 captures the packets and classifies the packets based on the DSCP value, a source sub network address, and a destination sub network address (the sub network addresses are determined by a source IP address and a destination IP address). Furthermore, the traffic monitor unit 3 stores traffic data representing the above classification result in an internal memory (not shown).

The traffic data are then transferred to a monitor manager 4 operable in compliance with a protocol, such as SNMP (Simple Network Management Protocol). The monitor manager 4 performs a statistical process on the traffic data to display traffic status, monitor abnormal status, and detect a trend. Further, the monitor manager 4 provides user interface to input a net mask required for determining a sub network address in a manner to be mentioned later.

As described above, traffic monitoring according to the embodiment is performed by accumulating for each service class and for each sub network. This shows that each service class and each sub network provide granularity for the traffic monitoring. With this structure, it is possible to collectively grasp traffic appearing for each sub network and each service class, instead of the fact that traffic information exchanged between all terminals on the network can be collectively grasped for all the applications.

As a result, it is possible to reduce memory capacity required for the traffic monitor unit 3 or to reduce traffic to the monitor manager 4.

Further, the traffic data which are given in a collective form are, in particular, effective as traffic management processing becomes huge in a large scale network.

Figure 2:
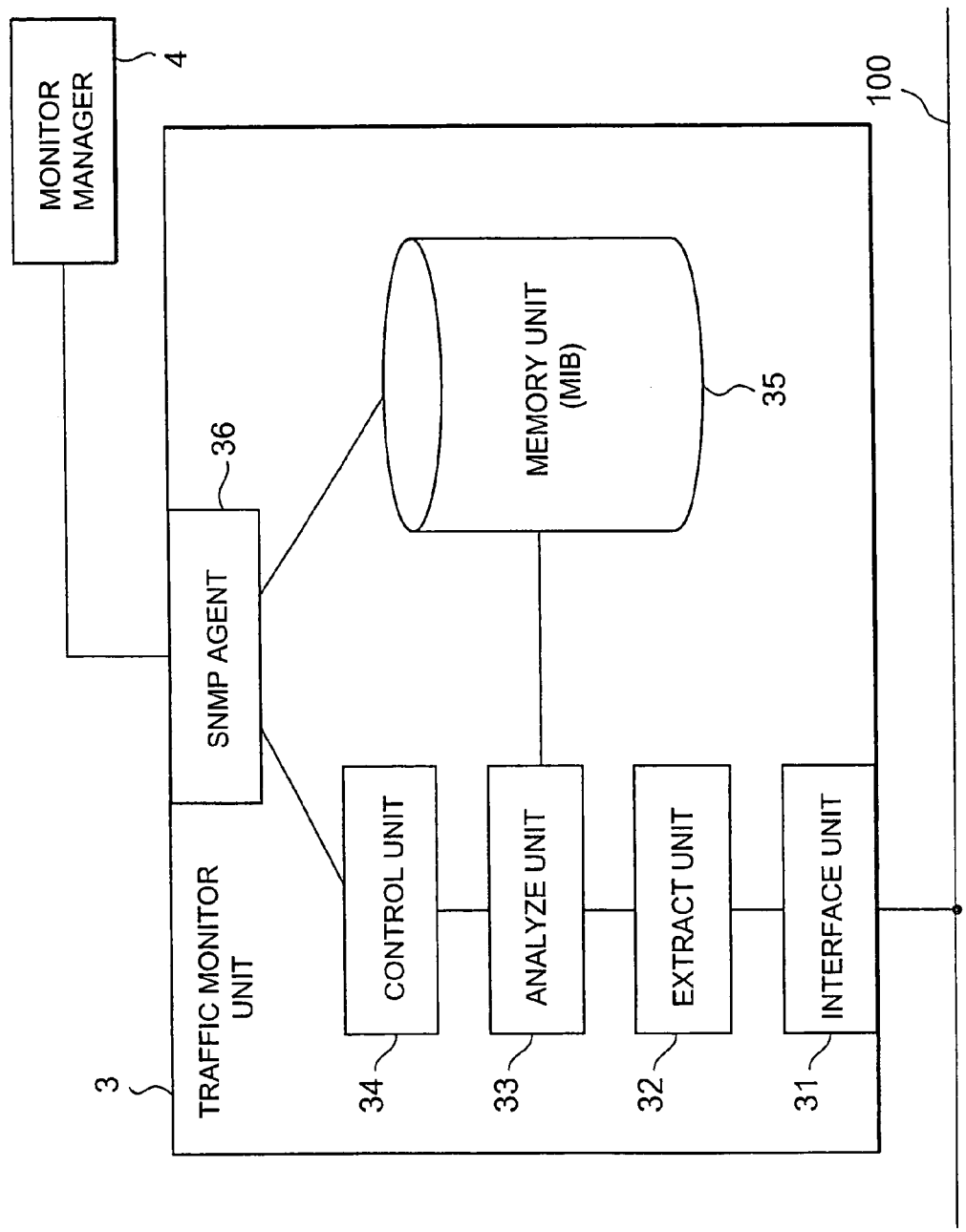
FIG. 2 shows a block diagram of a traffic monitor unit of the system shown in FIG. 1.

In FIG. 2, the traffic monitor unit 3 includes an interface unit 31, an extract unit 32, an analyze unit 33, a control unit 34, a memory unit (Management Information Base) 35, and an SNMP agent 36.

The interface unit 31 is connected to the network link 100 and captures IP packets. The unit 31 also terminates the physical layer and the data link layer.

The extract unit 32 extracts a DSCP value, a source IP address, and a destination IP address from an IP header of packets terminated at the lower layer. The DSCP value, the source IP address, and the destination IP address are used for counting IP packets.

The analyze unit 33 counts up traffic (IP packets) for each service class and for each sub network, from both the information extracted by the extract unit 32 and the net mask supplied by the control unit 34, and stores the counting result into the memory unit 35 in a MIB format.

The control unit 34 receives the net mask from the monitor manager 4 via the SNMP agent 36, and controls operation of whole traffic monitor unit 3.

The SNMP agent 36 performs data exchange between the traffic monitor unit 3 and the monitor manager 4.

The monitor manager 4 sets the net mask to the traffic monitor unit 3 by using SNMP protocol, accesses the traffic data stored in the memory unit 35 in a MIB format cyclically, and further statistically processes the traffic data to display traffic status, monitor abnormal status, and grasp trend.

Configuration of the embodiment of the invention has been explained, but the monitor manager 4 is well known in the art and have little relation to the invention. Thus, description about detail configuration and operation of the monitor manager 4 will be omitted.

Figure 3:
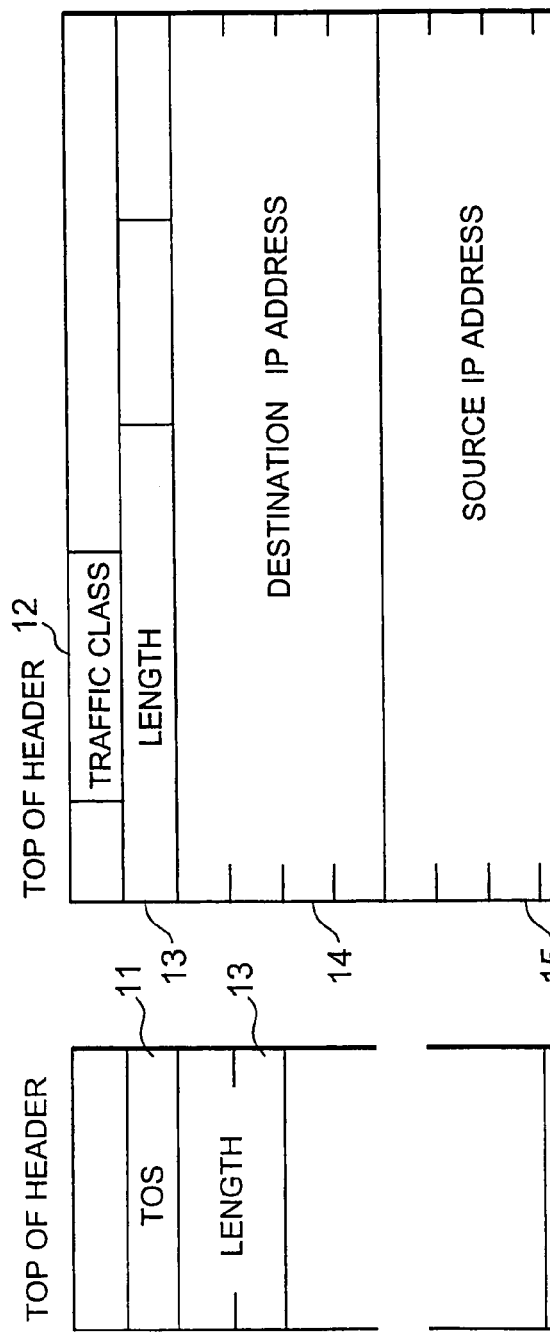
FIG. 3A shows header information of IPv4 format.
FIG. 3B shows header information of IPv6 format.

In FIG. 3A, header information of IPv4 (Internet Protocol Version 4) format is shown. On the other hand, in FIG. 3B, header information of IPv6 (Internet Protocol Version 6) format is shown.

Next, description is made about operation of a network traffic monitoring system of an embodiment of the Invention with reference to FIGS. 1-4.

At first, before traffic monitoring, the net mask which is used to determine sub network is set to the traffic monitor unit 3 by the traffic manager 4. The net mask is a sequence of bits to define a host address of an IP address. In setting, the sequence of bits may be used or a conventional address form, for example (255. 255. 255. 0), (255. 255. 0. 0), or (255. 0. 0. 0), may be used. The traffic monitor 3 stores the net mask into the control unit 34.

Next, when the traffic monitor unit 3 receives an IP packet passing through the link 100, the interface unit 31 terminates the physical layer and the data link layer of the received IP packet and sends header information of the IP packet to the extract unit 32.

Herein, the header information sent to the extract unit 32 will be described in detail with reference to FIGS. 3A and 3B. In FIG. 3A, the header is shown based on IPv4 format. There is a TOS (Type of Service) field 11 at the second byte from the top of the header. A Length field 13 is located from the third byte, a destination IP address field 14 is located from the thirteenth byte, and a source IP address field 15 is arranged from the fifteenth byte. The above-described DSCP value is mapped into the TOS field.

On the other hand, in FIG. 3B, the header is shown based on IPv6 format. There is a Traffic Class field 12 at the fifth bit from the top of the header. A Length field 13 is located from the fifth byte, a destination IP address field 14 is located from the ninth byte, a source IP address field 15 is located from the twenty fifth byte. The DSCP value is mapped into the Traffic Class field 12. The extract unit 32 reads out these information and send it to the analyze unit 33.

The analyze unit 33 receives the net mask from the control unit 34 and the destination IP address and the source IP address extracted from the IP header, and determines a destination sub network and a source sub network by adding the net mask, the destination IP address, and the source IP address. Then the analyze unit 33 produces entries each of which corresponds to a unique combination including the destination sub network address, the source sub network address, and the DSCP value (that is, service class) extracted from the IP header. For each entry, a length of the IP packet in the Length field and the number of receiving corresponding packets are each accumulated and stored in the memory unit 35 as MIB information.

Next, illustration is made about counting operation in the analyze unit 33. It is assumed that net mask (255. 255. 0. 0) is set to the traffic monitor 3 by the monitor manager 4.

In this case, it is further assumed that the traffic monitor 3 receives an IP packet sent from a source IP address (10. 24. 32. 101) to a destination IP address (20. 32. 52. 211), DSCP value of the packet is (101110) and the length of the packet is L.

Figure 4:
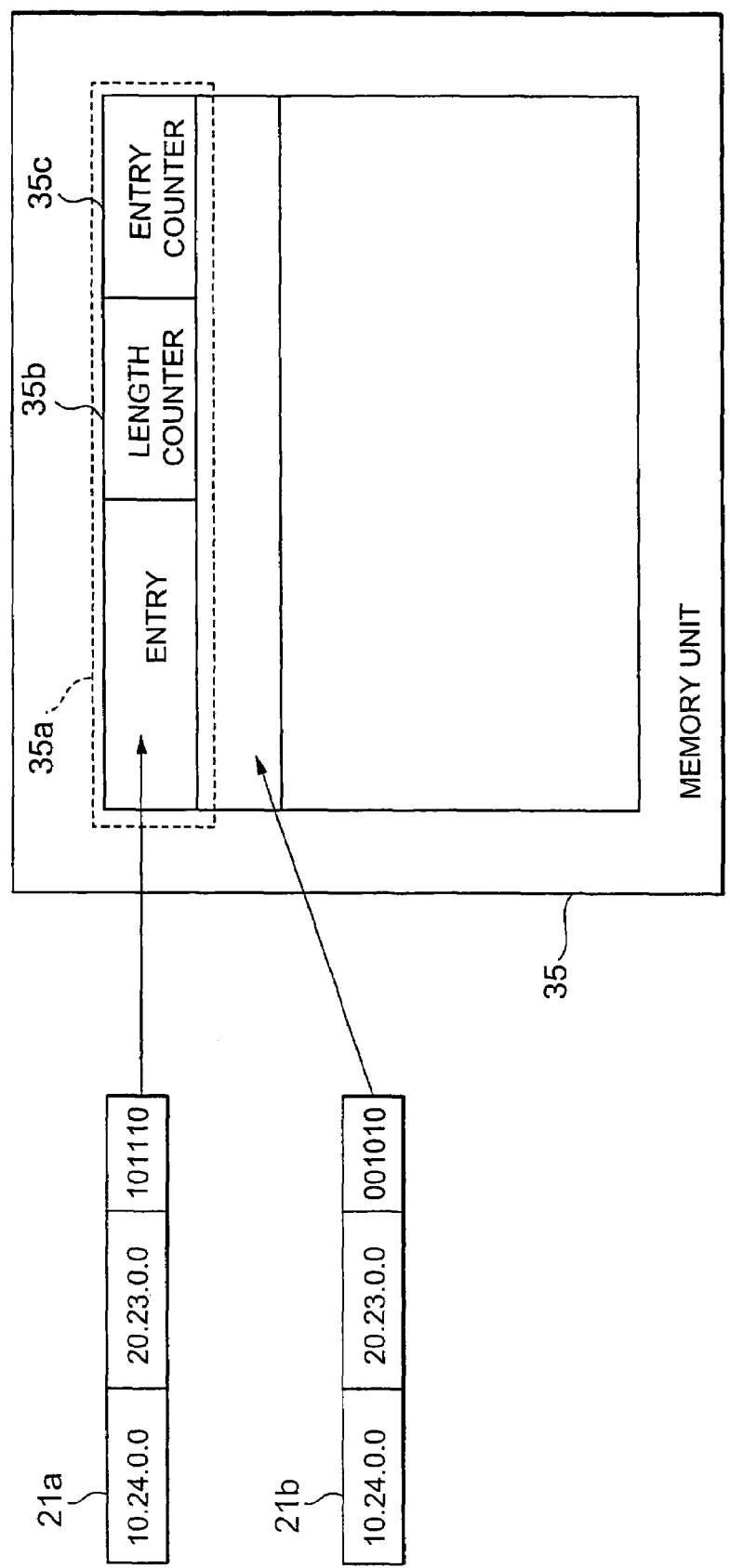
FIG. 4 shows a diagram for explaining counting operation in an analyze unit shown in FIG. 2.

At this point, the analyze unit 33 produces an entry 21a as shown in FIG. 4. The entry 21a is stored in the memory unit 35 as a record 35a including a length counter 35b and an entry counter 35c.

The entry counter 35c is "1", when the record 35a is produced. Also, the entry counter 35c is incremented by 1 whenever the corresponding entry is collected. That is, the entry counter 35c represents the number of receiving IP packets which corresponds to the entry.

In the length counter 35b, the packet length of the captured IP packet is accumulated. Therefore, the length counter 35b represents the transferred octet number of the corresponding IP packets.

Then, it is assumed that the traffic monitor 3 receives an IP packet sent from a source IP address (10. 24. 33. 10) to a destination IP address (20. 32. 52. 200) and the DSCP value of the packet is (101110) and the length of the packet is M. Since entry corresponding to the packet is coincident with the entry 21a, the entry counter 35c becomes "2" and the length counter becomes "L+M".

Next, it is assumed that the traffic monitor 3 further receives an IP packet sent from a source IP address (10. 24. 33. 10) to a destination IP address (20. 32. 52. 211) and the DSCP value of the packet is (001010) and the length of the packet is M. In this case, each of the sub network addresses is coincident with the above corresponding address, but DSCP value is different from the former packet. Therefore, these information is stored into the memory unit 35 as a new entry 21b.

When the entry is produced for each IP address in a similar manner to the conventional method, n*(n−1) entries must be provided in the maximum in a network including n hosts. Further, in the conventional method, since identification of protocol is performed based on the forth layer port number, requirement is made about the same number of entries as the number proportional to the port number to be used.

On the other hand, according to an embodiment of the invention, packets are classified into fourteen sorts of services by counting for each service or for each sub network. Therefore, when there are m (m<n) sub network addresses, m*(m−1)*14 entries must be provided in the maximum.

Therefore, in the traffic monitoring method of the invention, a memory capacity used in the traffic monitor 3 can be reduced.

Further, the method of invention can be applied to a large scale network. Since the number of entries is proportional to n or m, when the difference between n and m is large, that is, when the method is applied to the large scale network, outstanding effect of the method can be attained.

Still further, according to the invention, since the packets are counted for each service or for each sub network, an amount of information sent to the monitor manager 4 is also reduced, as a result, traffic on a network can be reduced.

Further, according to the invention, since information to be extracted is all included in the IP header, it is possible to monitor traffic in a service level even in a network using encapsulated protocol such as ESP (Encapsulation Security Payload) of IPSec or IPoverIP.

In a network using a protocol such as IPsec or IPoverIP, since the fourth layer port number may be encrypted or location of header information may be changed, a conventional method can not extract the header information correctly and can not classify packets for each protocol.

On the other hand, traffic monitoring method of the embodiment of the invention can monitor packets correctly, since information on traffic count for each service on the basis of DSCP is included outside of an encapsulated part in an IP header. Also, in a network using Diffserv protocol, traffic information classified based on a transmission priority can express network QoS (Quality of Service) more plainly than traffic information classified based on each application. Therefore, according to the traffic monitoring method according to the embodiment of the invention, performance of whole monitoring system can be improved.

Since the net mask supplied from the monitor manager 4 to the traffic monitor unit 3 can be taken any value, when a value (255. 255. 255. 255) is taken as the net mask, sub network address becomes equal to host IP address and it is possible to perform a conventional traffic monitoring of packets using End-to-End protocol.

Figure 5:
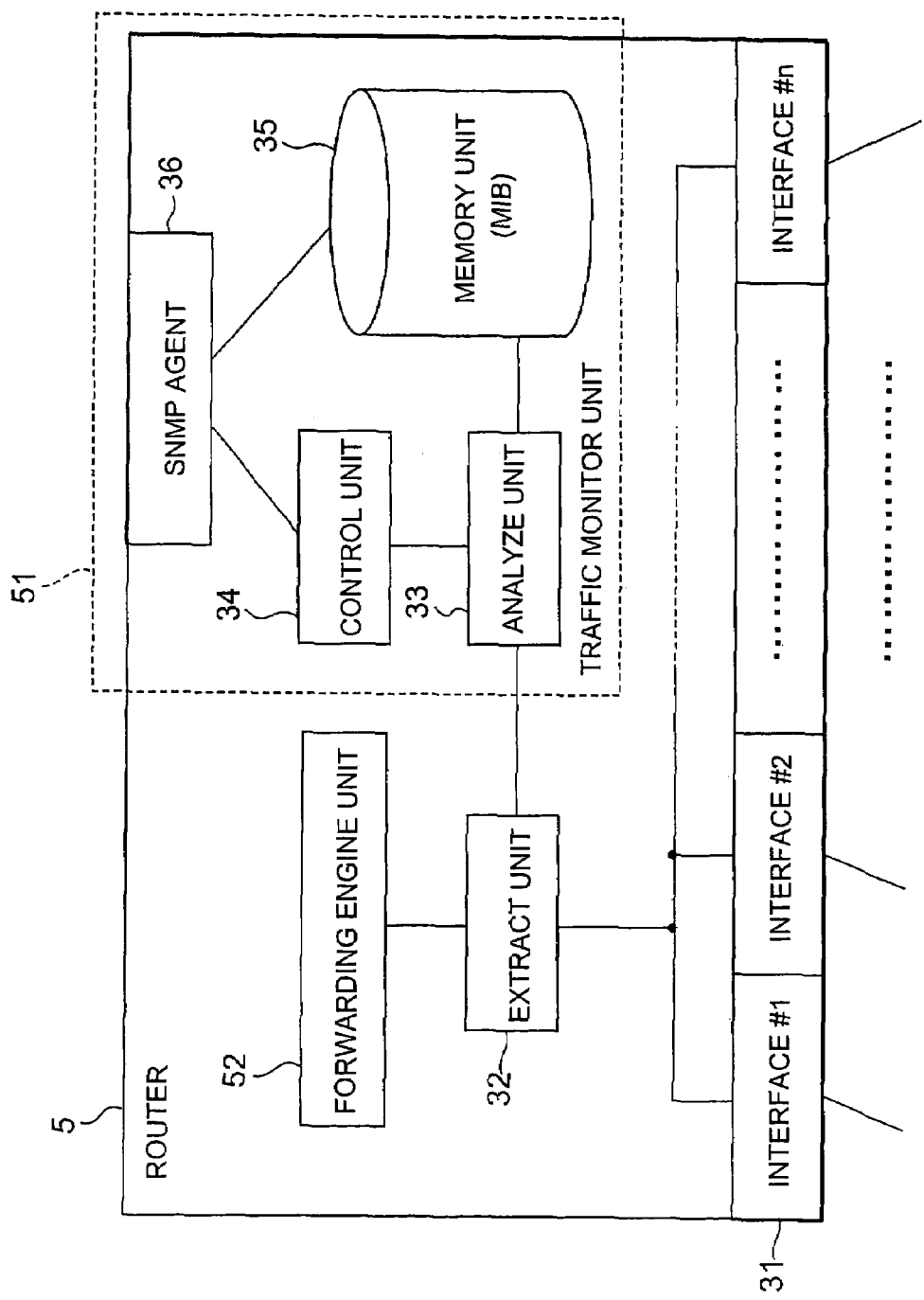
FIG. 5 shows a block diagram representing configuration of a router used in another embodiment of the invention.

In FIG. 5, a router 5 is shown which includes a traffic monitor unit 51 according to the invention.

When a packet arrives to any of interfaces #1 to #n in an interface unit 31, header information of the packet is transferred to a forwarding engine unit 52 and then, a destination is searched from destination IP address using a hardware structure. The router 5 can collect traffic information in despite of the interface unit 31 by receiving the header information. Therefore, traffic monitoring can be performed on a node.

In this embodiment, if a net mask (0. 0. 0. 0) is used, service distribution (which describes, for example, a degree of service distribution for each node (not shown)) can also be found.

Also, in the embodiment, if COPS (Common Open Policy System) protocol is used between the traffic monitor 51 and the monitor manager (not shown), high reliability of communication between them and setting of policy for monitor are achieved.

When COPS protocol is used, client type for communicating the policy must be established in advance, but client type for traffic monitor is registered as a new client type since the type is not determined by IETF.

As described above, the traffic monitoring method of the invention can capture service distribution which effects on behavior of an IP network using Diffserv protocol and can be applied to a large scale of network, by performing traffic monitoring for each service and for each sub network in the IP network.

While this invention has thus far been described in conjunction with a few embodiments thereof, it will readily be possible for those skilled in the art to put this invention into practice in various other manners. For example, this invention might be applicable to an ATM communication system that can distinguish among service classes.

What is claimed is:

1. A traffic monitoring system which monitors network traffic in an IP network in which an IP packet is transmitted according to a service class which is classified based on Diffserv protocol, comprising:
    a monitor unit which monitors the IP packet on the IP network;
    a detection unit which detects a service class which is classified based on Diffserv protocol, a source IP address, and a destination IP address of the IP packet, wherein the detection unit determines, from the detected IP addresses, a source sub network address and a destination sub network address;
    a classify unit which classifies traffic information based on the detected information; and
    a monitor manager which performs statistical process on the traffic information accumulated by the accumulate unit for displaying the traffic information, monitoring abnormal status in the network, or capturing trend in the network; and
    an accumulate unit which accumulates the classified traffic information for each service class and/or for each sub network address,
    wherein the detection unit uses a net mask to determine the sub network addresses, and the monitor manager supplies the net mask to the detection unit.

2. The traffic monitoring system of claim 1, wherein the service class is expressed by DSCP in a header field of the PP packet.

3. The traffic monitoring system of claim 1, wherein the IP network includes IP routers which are connected each other via links and the traffic monitoring system is included in the IP routers.

4. The traffic monitoring system of claim 1, wherein the accumulate unit accumulates the traffic information in a form of MIB.

5. A traffic monitoring method which monitors network traffic in an IP network in which an IP packet is transmitted according to a service class which is classified based on Diffserv protocol, comprising the steps of:
    monitoring the IP packet on the IP network;
    detecting a service class which is classified based on Diffserv protocol, a source IP address, and a destination IP address of the IP packet, wherein the detecting step determines, from the detected IP addresses, a source sub network address and a destination sub network address;
    classifying traffic information based on the detected information;
    accumulating the classified traffic information for each service class and/or for each sub network address; and
    performing statistical process on the accumulated traffic information,
    wherein the detecting step receives net mask and uses the net mask to determine the sub network addresses.

6. The traffic monitoring system of claim 5, wherein the service class is expressed by DSCP in a header field of the IP packet.

7. The traffic monitoring method of claim 5, wherein the IP network includes IP routers which are connected each other via links and the traffic monitoring method is incorporated in the IP router.

8. The traffic monitoring method of claim 5, wherein the accumulating step accumulates the traffic information in a form of MIB.

9. A recording medium readable by a computer, tangibly embodying a program of instructions executable by the computer to perform a traffic monitoring method which monitors network traffic in an IP network in which an IP packet is transmitted according to a service class which is classified based on Diffserv protocol, comprising the steps of:
    monitoring the IP packet on the IP network;
    detecting a service class which is classified based on Diffserv protocol, a source IP address, and a destination IP address of the IP packet, wherein the detecting step determines, from the detected IP addresses, a source sub network address and a destination sub network address;
    classifying traffic information based on the detected information;
    accumulating the classified traffic information for each service class and/or for each sub network address; and
    performing statistical process on the accumulated traffic information,
    wherein the detecting step receives net mask and uses the net mask to determine the sub network addresses.

* * * * *